358-190. OR 3,920,892 SR

United S T358/190
Dietz

[11] 3,920,892
[45] Nov. 18, 1975

[54] ALTERNATING CURRENT LINE VOLTAGE SUPPLY ISOLATION USING DEFLECTION SYSTEM OUTPUT TRANSFORMER

[75] Inventor: Wolfgang Friedrich Wilhelm Dietz, New Hope, Pa.

[73] Assignee: RCA Corporation, New York, N.Y.

[22] Filed: Apr. 12, 1974

[21] Appl. No.: 460,648

[30] Foreign Application Priority Data

Oct. 23, 1973 United Kingdom.............. 49217/73

[52] U.S. Cl........................ 178/7.3 R; 178/DIG. 11
[51] Int. Cl.[2].......................................... H04N 3/18
[58] Field of Search....... 178/7.3 R, 7.5 R, DIG. 11; 315/408

[56] References Cited

UNITED STATES PATENTS

| | | | |
|---|---|---|---|
| 3,452,244 | 6/1969 | Dietz | 315/408 |
| 3,461,232 | 8/1969 | Wendt | 178/DIG. 11 |
| 3,641,267 | 2/1972 | Cavallari | 178/DIG. 11 |
| 3,737,572 | 6/1973 | Frizane et al. | 178/7.3 R |
| 3,740,474 | 6/1973 | Dietz | 178/DIG. 11 |
| 3,742,242 | 6/1973 | Morio et al. | 178/DIG. 11 |
| 3,766,314 | 10/1973 | Riechmann | 178/DIG. 11 |
| 3,803,446 | 4/1974 | Faglioni | 178/DIG.11 |

*Primary Examiner*—Albert J. Mayer
*Assistant Examiner*—Saffian, Mitchell
*Attorney, Agent, or Firm*—Eugene M. Whitacre; Lawrence M. Lunn

[57] ABSTRACT

A dual bidirectional switch television receiver deflection system with high power handling capability utilizes the deflection system output transformer to provide isolation of the receiver chassis from the alternating current line-derived reference potential. Power supplies referenced to the receiver chassis are derived from secondary windings of the output transformer. One of the secondary windings drives the deflection winding. Voltage variations induced in the deflection winding are thus referenced to the chassis potential. In a second embodiment one of the bidirectional switches is also placed in the secondary winding containing the deflection winding.

10 Claims, 2 Drawing Figures

ALTERNATING CURRENT LINE VOLTAGE SUPPLY ISOLATION USING DEFLECTION SYSTEM OUTPUT TRANSFORMER

BACKGROUND OF THE INVENTION

This invention relates to a system for isolating television receiver chassis from alternating current line voltage power supplies.

Considerable effort has been expended in the past to avoid the use of isolation transformers to supply power to television receivers. Since an isolation transformer must be a physically large, bulky and costly receiver component to be capable of handling the power requirements of the television receiver, inclusion of an isolation transformer has meant that television receivers had to be more bulky then without one and also more costly.

The use of solid state components which do not require the high direct current operating voltages necessary in tube-type receiver circuits has led to the use of lower direct current operating voltages derived directly from rectified and filtered alternating current line voltage without the necessity for an isolation transformer. However, there is a problem associated with the elimination of the isolation transformer, that problem being loss of isolation of the receiver chassis from the alternating current line. That is, the receiver chassis without the isolation transformer is coupled to some reference voltage established by the alternating current line. Such a chassis is frequently referred to as a "hot" chassis as opposed to an isolated or "cold" chassis.

On a hot chassis all of the operator controls and the receiver cabinet must be isolated from the chassis to prevent the possibility of shock to the operator. Further, with the addition to the receiver of other functions which require the use of peripheral equipment such as television cameras and video tape recorders which are isolated from the alternating current line reference voltage, the problem of isolation becomes greater. These devices, when coupled to the receiver, must operate from the same reference voltage as the receiver in order to function properly. However, by virtue of the fact that their reference voltages may vary substantially from the receiver's reference voltage, i.e. the alternating current line reference voltage, damaging currents may result between the various reference potentials established in the receiver and the associated peripheral equipment as well as the possibility of shock to the operator. Thus, it would be desirable to have the advantages of a line transformer isolation scheme without the bulk and cost normally associated therewith.

SUMMARY OF THE INVENTION

In accordance with the invention a system is provided for isolating a source of reference potential within a television receiver from the alternating current line voltage source from which power for said receiver is derived. The system includes first and second terminals and rectifying, filtering and storage means coupled to the first and second terminals and to the alternating current line voltage source for rectifying, filtering and storing alternating current line voltage to provide at the first terminal a first direct current voltage supply with respect to the second terminal. Also included are switching means including first and second bidirectionally conductive switches coupled to a deflection winding for generating deflection current in the deflection winding, the first switch being direct current coupled to the first and second terminals.

A first winding is coupled to the switching means for having induced therein current flow in response to operation of the switching means. A third terminal electrically isolated from the first and second terminals is adapted for coupling to the source of reference potential. A second winding is magnetically coupled to the first winding and electrically isolated therefrom for having induced therein voltage variations in response to current flow in the first winding. The second winding is coupled to the third terminal for having the voltage variations induced therein with respect to the reference potential. Second rectifying means are provided for rectifying the voltage variations in the second winding with respect to the reference potential and for supplying the rectified variations to the receiver.

DESCRIPTION OF THE PREFERRED EMBODIMENT

Figures 1, 2:
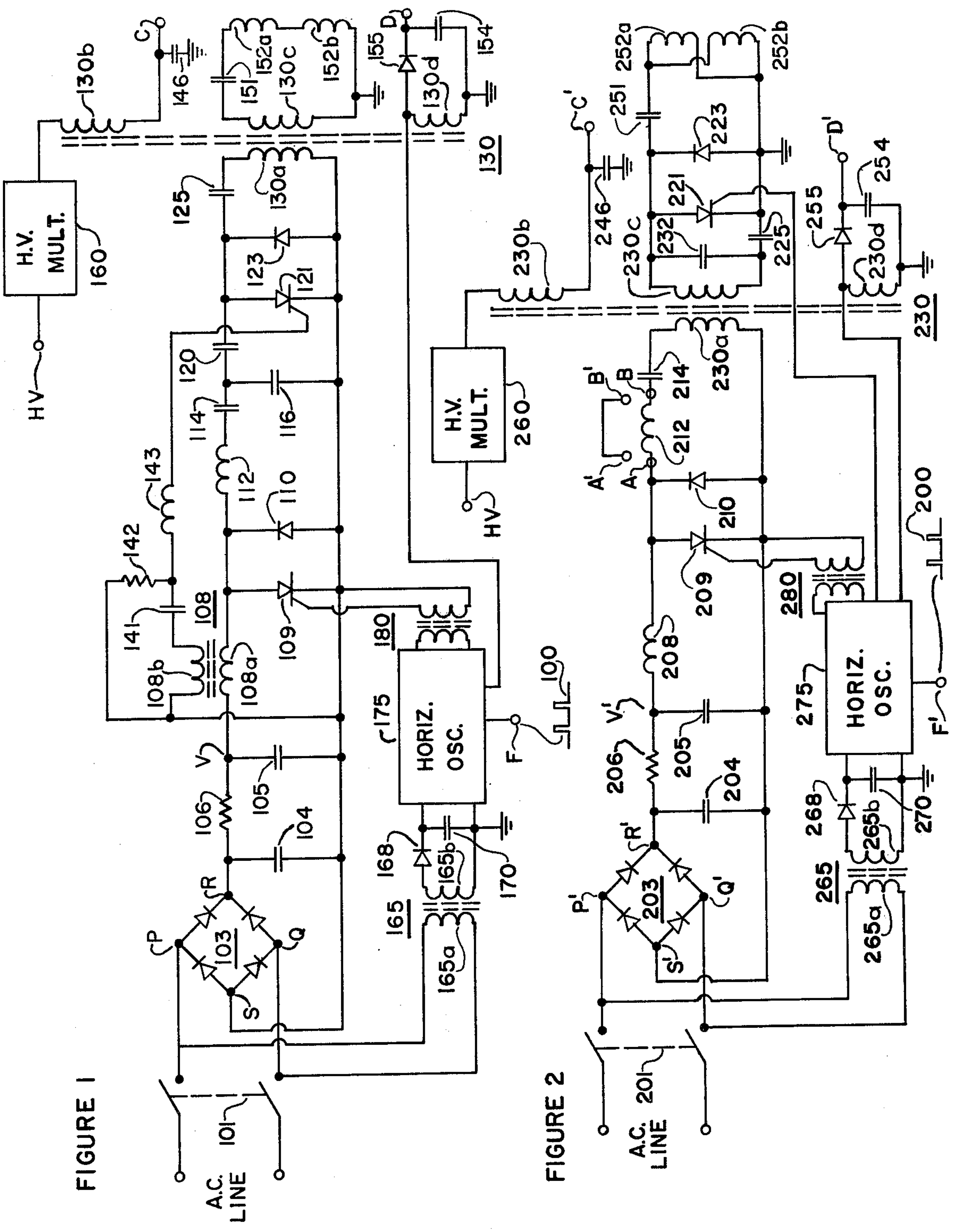
FIG. 1 is a block and schematic diagram of a deflection circuit embodying the invention.
FIG. 2 is a block and schematic diagram of a deflection circuit including another embodiment of the invention.

In a first embodiment of the invention illustrated in FIG. 1, the alternating current line is coupled through switch 101 to two terminals P and Q of a bridge rectifier 103. Terminals P and Q are also coupled across a primary winding 165*a* of a transformer 165. A secondary winding 165*b* of transformer 165 steps down alternating current line voltage which is rectified by a rectifier 168 and stored in a capacitor 170 to provide the low direct current operating voltage-low power requirements of a horizontal oscillator 175. A horizontal sync signal 100 is coupled to a terminal F of horizontal oscillator 175.

A storage capacitor 104 is coupled across two remaining terminals R and S of bridge rectifier 103. A filter resistor 106 is also coupled to terminal R. The remaining terminal of resistor 106 is coupled to a terminal of a filter capacitor 105, the remaining terminal of which is coupled to terminal S. Terminal V, the junction of resistor 105 and capacitor 106, is coupled to a terminal of a primary winding 108*a* of an input reactor 108. The remaining terminal of winding 108*a* is coupled to the anode of an SCR 109 and to the cathode of a diode 110 which together comprise a bidirectionally conductive commutating switch. The cathode of SCR 109 and anode of diode 110 are coupled to terminal S.

The joined anode of SCR 109 and cathode of diode 110 are coupled to a first terminal of a commutating inductor 112 the remaining terminal of which is coupled to a first terminal of a capacitive voltage divider network comprising a capacitor 114 and a capacitor 116 in series. The remaining terminal of capacitor 116 is coupled to terminal S. A first terminal of a commutating capacitor 120 is coupled to the junction of capacitors 114 and 116 and the remaining terminal of capacitor 120 is coupled to the anode of an SCR 121 and to the cathode of a diode 123.

SCR 121 and diode 123 together comprise a bidirectionally conductive trace switch. The cathode of SCR 121 and the anode of diode 123 are coupled to terminal S. A series combination of a storage capacitor 125 and a primary winding 130*a* of a horizontal output transformer 130 are coupled across the bidirectionally conductive trace switch comprising SCR 121 and diode 123. A primary winding of a relatively small, low-power isolation transformer 180 is coupled to horizontal oscillator 175. A secondary winding of transformer 180 is coupled to the gate electrode of commutating SCR 109 and to terminal S.

A secondary winding 108*b* of input reactor 108 is coupled between terminal S and a terminal of a capacitor 141. The remaining terminal of capacitor 141 is coupled through a resistor 142 to terminal S and through a winding 143 to the gate electrode of trace SCR 121. The circuitry comprising elements 141, 142, and 143 shapes a voltage pulse appearing across winding 108*b* when current flows through 108*a*. The pulse is used to trigger SCR 121 into its conductive state.

A winding 130*b* of horizontal output transformer 130 is coupled between a terminal C and a high voltage multiplier 160. An output terminal HV of high voltage multiplier 160 supplies high voltage derived from multiplication and rectification of horizontal deflection retrace voltage pulses generated across winding 130*b* to a kinescope (not shown). Terminal C is one terminal of a storage capacitor 146 the remaining terminal of which is coupled to ground. Trace interval voltage variations appearing across capacitor 146 are supplied to other receiver circuits.

A winding 130*d* of transformer 130 is coupled between ground and the anode of a rectifier diode 155. The cathode of rectifier 155 is coupled to a terminal D of a storage capacitor 154 the remaining terminal of which is coupled to ground. Rectified voltage is provided from terminal D for other receiver circuits. Winding 130*d* is also coupled to horizontal oscillator 175 for providing a pulse for automatic frequency control of horizontal oscillator 175.

A winding 130*c* of transformer 130 is coupled to ground at one terminal. The remaining terminal of winding 130c is coupled to a series combination of an S-shaping capacitor 151 and a deflection yoke comprising two series coupled windings 152*a* and 152*b*. The remaining terminal of the series circuit is coupled to ground.

In the operation of the circuit of FIG. 1 the ground potential referred to is the potential of the receiver chassis. The operation of the dual bidirectional switch horizontal deflection system illustrated in FIG. 1 is described in detail in U.S. Pat. No. 3,452,244 issued on June 24, 1969 to the same inventor as the present invention, but will be described briefly here to aid in understanding the present invention.

At the beginning of the horizontal deflection trace interval, trace damper diode 123 is forward biased by virtue of the current flowing in winding 130*a* at the end of the succeeding retrace interval. Current flows in the forward direction through diode 123 to further charge capacitor 125. Preceeding current flow from the direct current voltage supply established at terminal V through windings 108*a* and 112 has charged capacitors 114, 116, 120, and 125. At some time approximately half way through the trace interval, diode 123 becomes reverse biased.

The current flow through winding 108a as energy is added to the system causes a corresponding voltage to be induced across winding 108*b* which when shaped by elements 141, 142, and 143 causes SCR 121 to be placed in condition for conduction. Then, as SCR 121 becomes forward biased, it begins to conduct causing current to reverse in winding 130*a* as capacitor 125 discharges. The reversal of current flow in winding 130*a* marks the beginning of the second half of the trace interval.

Capacitors 114, 116, and 120 which have also charged from current flow through windings 108*a* and 112 then begin to discharge through winding 112 as an output pulse from horizontal oscillator 175 is coupled to the secondary winding of transformer 180 inducing sufficient voltage at the gate electrode of SCR 109 to render it conductive. This occurs shortly before the beginning of the retrace interval. Capacitors 114, 116, and 120 discharge through winding 112 and SCR 109. Discharging current for capacitors 114 and 120 flows through diode 123. As discharging current for capacitors 114 and 120 increases, SCR 121 becomes non-conductive. Winding 130*a* also conducts discharging current for capacitors 114 and 120.

As capacitors 114 and 120 discharge, the energy stored in windings 112 and 130*a* causes them to become charged in the opposite direction. Diode 123 becomes reverse biased and is rendered non-conductive. The retrace interval then begins as the resonant retrace circuit comprising the inductance of winding 130*a* and the capacitance of capacitors 125, 120, and 116 allows the energy to be transferred from the inductance to the capacitance and back for a positive half cycle of operation. The current in winding 130 decreases rapidly as energy is recovered therefrom to charge capacitors 125, 120, and 116. Then the current in winding 130*a* reverses as capacitors 125, 120, and 116 discharge back through winding 130. As the current in winding 130 reaches a maximum, the deflection retrace interval ends. Diode 123 begins to conduct to damp the negative half cycle of oscillation between winding 130 and capacitors 125, 120, and 116. Energy begins to be recovered from winding 130*a* as diode 123 conducts to charge capacitor 125. This marks the beginning of the next succeeding trace interval.

The flow of current in winding 130*a* induces voltage variations across winding 130*b*, 130*c*, and 130*d*. The retrace interval pulse appearing at the junction of winding 130*b* and high voltage multiplier 160 is rectified to develop the high kinescope voltage at terminal HV. The positive trace interval voltage at terminal C supplies the operating potential requirements of other receiver circuits coupled across capacitor 146. Similarly, positive trace voltage appearing at the anode of diode 155 supplies direct current voltage at terminal D. A similar voltage induced across winding 130*c* is sufficient to cause deflection current to flow in the serially coupled deflection windings 152*a* and 152*b*. S-shaping capacitor 151 aids in achieving deflection linearity.

It must be noted that the voltages induced across windings 130*b*, 130*c* and 130*d* are referenced to the receiver chassis ground coupled to terminals of capacitors 146 and 154 are not referenced to the alternating current line derived reference potential established at terminal S of the horizontal deflection generator. By utilizing the power handling capability of the SCR horizontal deflection system and coupling the voltage variations induced in winding 130*a* through the horizontal output transformer 130, the power requirements of the rest of the receiver circuits may be supplied while maintaining isolation of the chassis from the alternating current line. This isolation is achieved without the need for an isolation transformer for the receiver power supplies. The isolation transformer requirements of the receiver, with the exception of the low voltage-low power requirements served by transformer 165 and the signal coupling isolation transformer 180, are eliminated.

It should be noted that the switching voltages established across the secondary winding of transformer 180 and across winding **108*b* for SCR's 109 and 121 respectively are referenced to the deflection generator reference potential established at terminal S. It should further be noted that the voltage across the serial combination of deflection windings 152*a* and 152*b* is referenced to the chassis potential rather than to the potential at terminal S. This is significant in that is provides control of the voltage difference between the peak horizontal deflection winding potential and the potentials of other nearby chassis-referenced receiver components such as, for example, the vertical deflection windings. This peak voltage difference may be further reduced by other methods known in the art such as, for example, using a center-tapped secondary winding 130*c* and coupling the center tap rather than the junction of windings 130*c* and 152** to chassis ground.

In a second embodiment of the invention illustrated in FIG. 2, the alternating current line is coupled through switch 201 to two terminals P' and Q' of a bridge rectifier 203. Terminals P' and Q' are also coupled across a primary winding **265*a* of a transformer 265. A secondary winding 265*b* of transformer 265 steps down alternating current line voltage which is rectified by a rectifier 268 and stored in a capacitor 270 to provide the low direct current operating voltage, low power requirements of a horizontal oscillator 275. A horizontal sync signal 200 is coupled to a terminal F' of horizontal oscillator 275**.

A storage capacitor 204 is coupled across two remaining terminals R' and S' of bridge rectifier 203. A filter resistor 206 is also coupled to terminal R'. The remaining terminal of resistor 206 is coupled to a terminal of a filter capacitor 205 the remaining terminal of which is coupled to terminal S'. Terminal V', the junction of resistor 205 and capacitor 206, is coupled to a terminal of an input reactor winding 208. The remaining terminal of winding 208 is coupled to the anode of an SCR 209 and to the cathode of a diode 210 which together comprise a bidirectionally conductive commutating switch. The cathode of SCR 209 and the anode of diode 210 are coupled to terminal S'.

The joined anode of SCR 209 and cathode of diode 210 are coupled to a first terminal of a commutating inductor 212 the remaining terminal of which is coupled to a first terminal of a capacitor 214. The remaining terminal of capacitor 214 is coupled to a first terminal of a primary winding 230a of a horizontal output transformer 230. The remaining terminal of winding **230*a* is coupled to terminal S'. A primary winding of an isolation transformer 280 is coupled to horizontal oscillator 275. A secondary winding of transformer 280 is coupled to the gate electrode of commutating SCR 209** and to terminal S'.

A winding **230*b* of horizontal output transformer 230 is coupled between a terminal C' and a high voltage multiplier 260. An output terminal HV of high voltage multiplier 260 supplies high voltage derived from rectification and multiplication of horizontal deflection retrace voltage pulses generated across winding 230*b* to a kinescope (not shown). Terminal C' is coupled to a terminal of a storage capacitor 246 the remaining terminal of which is coupled to ground. Trace interval voltage appearing across capacitor 246** is supplied to other receiver circuits.

A winding **230*d* of transformer 230 is coupled between ground and the anode of a rectifier diode 255. The cathode of rectifier 255 is coupled to a terminal D' of a storage capacitor 254 the remaining terminal of which is coupled to ground. Rectified voltage is provided from terminal D' for other receiver circuits. Winding 230*d* is also coupled to horizontal oscillator 275 for providing a pulse for automatic frequency control of horizontal oscillator 275**.

A winding **230*c* of transformer 230 is coupled to ground through a storage capacitor 225 at one terminal. The remaining terminal of winding 230*c* is coupled to a series combination of an S-shaping capacitor 251 and a deflection yoke comprising two parallel coupled deflection windings 252*a* and 252*b*. A retrace capacitor 232 is coupled across winding 230*c*. The remaining terminal of the series circuit is coupled to ground. A bidirectionally conductive trace switch comprising an SCR 221 and a diode 223 is coupled to the junction of winding 230*c* and capacitor 251. The anode of SCR 221 and the cathode of diode 223 are coupled to this junction. The cathode of SCR 221 and the anode of diode 223** are coupled to ground.

In the operation of the circuit of FIG. 2 the ground potential referred to is again the potential of the receiver chassis. The operation of the dual bidirectional switch horizontal deflection system illustrated in FIG. 2 is similar to that of the system illustrated in FIG. 1. The differences will be described here to aid in understanding this embodiment. In the basic dual bidirectional switch deflection system described in the aforementioned U.S. Patent, the trace and commutating switches are alternating current coupled and rely on capacitive and inductive energy storage elements to produce the currents which replenish energy dissipated in the deflection system and transferred from the system to secondary windings of the horizontal output transformer. In the system of FIG. 2 the trace and commutating switches remain alternating current coupled, but in this embodiment the switches are also transformer coupled through the horizontal output transformer.

At the beginning of the horizontal deflection trace interval, trace damper diode 223 is forward biased by virtue of the energy stored in windings **252*a* and 252*b* at the end of the preceding retrace interval. Current flows in the forward direction through diode 223 to charge capacitors 225 and 251. At some time approximately half way through the trace interval, diode 223** becomes reverse biased.

A voltage pulse referenced to the chassis ground supplied by horizontal oscillator 275 causes the gate electrode of SCR 221 to go positive, placing SCR 221 in condition for conduction. SCR 221 begins to conduct causing current to reverse in windings 230c, **252*a* and 252*b* as capacitors 225 and 251 discharge. The reversal of current flow in yoke windings 252*a* and 252*b*** marks the beginning of the second half of the horizontal deflection trace interval.

Capacitor 214, which previously has been charged from current flow through windings 208 and 212, begins to discharge through winding 212 as an output pulse from horizontal oscillator 275 is coupled to the secondary winding of transformer 280 inducing a voltage pulse with respect to terminal S′ at the gate electrode of SCR 209 to render it conductive. This initiates the commutation interval, which encompasses the retrace interval. This occurs shortly before the beginning of the retrace interval. Capacitor 214 discharges through windings 212 and **230*a* and SCR 209. Discharging current for capacitor 214 through winding 230*a* causes voltage variations to appear across winding 230*c*. These variations cause current to flow in trace SCR 221 and diode 223. SCR 221** becomes reverse biased and is rendered non-conductive.

Current continues to flow in diode 223 until the discharging current for capacitor 214 drops below a value corresponding to the deflection current in windings **252*a* and 252*b*. Diode 223 then becomes reverse biased. Windings 252*a* and 252*b* then oscillate for a positive half cycle with retrace capacitor 232 as the windings transfer energy to capacitor 232. As the voltage across capacitor 232 reaches a peak value, the current in windings 252*a* and 252*b* reaches zero at the middle of the retrace interval. Then during the second half of the retrace interval, retrace capacitor 232 discharges through windings 252*a* and 252*b* causing the reversal of current necessary for the second half of the retrace interval. As the current reaches a maximum, the negative half cycle of oscillation of windings 252*a* and 252*b* with retrace capacitor 232 is damped by conduction of diode 223. As damper diode 223 begins to conduct, the deflection retrace interval ends. Energy stored in windings 230*c*, 252*a* and 252*b* is recovered as diode 223 becomes forward biased causing deflection trace interval current to flow in deflection windings 252*a* and 252*b* and capacitor 251.** This marks the beginning of the next succeeding trace interval.

The flow of current in windings **230 *a* and 230*c* induces similar voltage variations across windings 230*b* and 230*d*. The retrace interval pulse appearing at the junction of windings 230*b* and high voltage multiplier 260 is rectified to develop the high kinescope voltage at terminal HV. The positive trace interval voltage induced at point C′ provides a trace interval direct current voltage supply across capacitor 246. Similarly, positive trace voltage appearing at the anode of diode 255** supplies direct current voltage at terminal D′.

It must be noted that the voltages induced across windings **230*b***, 230*c* and **230*d* are referenced to the receiver chassis ground coupled to terminals of capacitors 225, 246 and 254 and are not referenced to the alternating current line derived reference potential established at terminal S′ of the horizontal deflection generator. By utilizing the power handling capability of the SCR horizontal deflection system and coupling the voltage variations induced in winding 230*a* to windings 230*b***, 230*c* and **230*d* of horizontal output transformer 230, the power requirements of the rest of the receiver circuits may be supplied while maintaining isolation of the chassis from the alternating current line. This isolation is achieved as in the embodiment of FIG. 1 without the need for an isolation transformer for the receiver power supplies. The isolation transformer requirements of the receiver, with the exception of the low voltage power requirements served by transformer 265 and the signal coupling isolation transformer 280,** are eliminated.

It should be noted that in the embodiment of FIG. 2 the switching voltage for trace SCR 221 must be established with reference to the chassis ground rather than terminal S′. This results because trace SCR 221 in this embodiment is in secondary winding **230*c* of the horizontal output and isolation transformer 230. Thus, the cathode of SCR 221** is referenced to the chassis ground rather than to terminal S′.

It should further be noted that while deflection windings **152*a* and 152*b* of FIG. 1 are series coupled and windings 252*a* and 252*b* of FIG. 2 are parallel coupled, either a series or parallel configuration could be used with either the trace switching arrangement of FIG. 1 or FIG. 2** depending upon the impedance of the deflection windings used.

An advantage of the embodiment of FIG. 2 is that if transformer 230 is designed such that the leakage inductance between windings **230*a* and 230*b* equals the required inductance of commutating winding 212, then commutating winding 212 may be eliminated. Graphically, this may be illustrated by shorting winding 212 by coupling terminals A–B of FIG. 2 to terminals A′–B′. This is possible because placing the trace switch comprising SCR 221 and diode 223 in the secondary winding 230*c* of horizontal output transformer 230 places the leakage inductance of windings 230*a* and 230*c* between the trace switch and the commutating switch comprising SCR 209 and diode 210.** The configuration of commutating inductance and commutating capacitance between the trace and commutating switches necessary for proper operation of the dual bidirectional switch deflection system is thus preserved.

Additional advantages of the embodiment of FIG. 2 are that the only currents induced by current flow in winding **230*a* which are required to flow in winding 230*c* are the commutating interval current required to reverse bias trace SCR 221 and the following recharging currents for capacitors 225 and 251. Thus less RMS current is required to flow in winding 230*c* than in the embodiment of FIG. 1. Further, there is less interaction between the current in deflection windings 252*a* and 252*b* and variations in load currents and voltages at terminals C′ and D′ since the trace switch is in secondary winding 230*c* with the deflection windings. Thus the embodiment of FIG. 2** provides better linearity of the horizontal deflection scanning current during the trace interval.

The embodiments of both FIGS. 1 and 2 also achieve a further significant advantage over non-isolated or "hot" chassis embodiments of the dual bidirectional switch deflection system. As was previously mentioned, such systems typically used half-wave rectified line voltage to provide deflection power. It may be seen that while the systems of FIGS. 1 and 2 utilize full wave bridge rectifiers requiring four diodes rather than the single diode required by a half-wave rectifier arrangement, rectified voltage is supplied to the systems of FIGS. 1 and 2 substantially continuously. The full wave rectified voltage thus allows smaller filter capacitors 104 and 105 of FIG. 1 and 204 and 205 of FIG. 2 to be used resulting in a cost savings in these filtering and storage power supply capacitors.

What is claimed is:

1. A system for isolating a source of reference potential within a television receiver from the alternating current line voltage source from which power for said receiver is derived, comprising:

first and second terminals;

rectifying, filtering and storage means coupled to said terminals and to said alternating current line voltage source for rectifying, filtering and storing said alternating current line voltage to provide at said first terminal a first direct current voltage supply with respect to said second terminal;

switching means including first and second bidirectionally conductive switches coupled to a deflection winding for generating deflection current in said deflection winding, said first switch being direct current coupled to said first and second terminals;

a first winding coupled to said switching means for having induced therein current flow in response to operation of said switching means; and a second winding magnetically coupled to said first winding and electrically isolated therefrom for having induced therein voltage variations in response to said current flow in said first winding, said second winding being coupled to said source of reference potential for having said voltage variations induced therein with reespect to said reference potential.

2. A system for isolating a source of reference potential from an alternating current line voltage source according to claim 1 wherein said first and second switches are each direct current coupled to one of said first and second terminals.

3. A system for isolating a source of reference potential from an alternating current line voltage source according to claim 1 wherein said first and second switches are coupled to each other by said first and second electrically isolated windings, said first and second windings being primary and secondary windings respectively of a deflection output transformer.

4. A system according to claim 3 wherein the leakage inductance between said first winding and said second winding provides series inductance between said first and second bidirectionally conductive switches for the operation of said first and second switches.

5. A system for isolating a source of reference potential from an alternating current line voltage source according to claim 1 wherein said deflection winding is coupled to said second winding for being energized therefrom.

6. A system for isolating a source of reference potential from an alternating current line voltage source according to claim 1 wherein second rectifying means are coupled to said second winding for rectifying said voltage variations in said second winding with respect to said reference potential and for supplying said rectified variations to said receiver.

7. A system for isolating a source of reference potential within a television receiver from the alternating current line voltage source from which power for said receiver is derived, comprising:

first and second terminals;

rectifying and filtering means coupled to said terminals and to said alternating current line voltage source for providing at said first terminal a first direct current voltage supply with respect to said second terminal;

switching means including first and second bidirectionally conductive switches coupled to a deflection winding for generating deflection current in said deflection winding, said first switch being direct current coupled to said first and second terminals;

a first winding coupled to said switching means for having induced therein current flow in response to operation of said switching means; and at least a second winding magnetically coupled to said first winding and electrically isolated therefrom for having induced therein voltage variations in response to said current flow in said first winding, said second winding being coupled to said source of reference potential for having said voltage variations induced therein with respect to said reference potential, said second winding also being coupled to said deflection winding for inducing said deflection current flow therein in response to said voltage variations.

8. A system for isolating a source of reference potential from an alternating current line voltage source according to claim 7 wherein a third winding is magnetically coupled to said first winding and electrically isolated therefrom, said third winding being coupled to said source of reference potential for having voltage variations induced thereacross with respect to reference potential; and second rectifying means are coupled to said third winding for rectifying said voltage variations induced across said third winding with respect to reference potential and for supplying said rectified variations to said receiver.

9. A system for isolating a source of reference potential within a television receiver from the alternating current line voltage source from which power for said receiver is derived, comprising:

first and second terminals;

rectifying and filtering means coupled to said terminals and to said alternating current line voltage source for providing at said first terminal a first direct current voltage supply with respect to said second terminal;

first bidirectionally conductive switching means direct current coupled to said first and second terminals;

a first winding coupled to said first switching means for having induced therein current flow in response to operation of said first switching means;

at least a second winding magnetically coupled to said first winding and electrically isolated therefrom for having induced therein voltage variations in response to said current flow in said first winding, said second winding being coupled to said source of reference potential for having said voltage variations induced therein with respect to said reference potential; and second bidirectionally conductive switching means and a deflection winding coupled to each other and to said second winding for having induced thereacross voltage variations with respect to said reference potential, said second bidirectionally conductive switching means being coupled to a source of signals for switching in response thereto for inducing deflection current in said deflection winding during a portion of each deflection interval.

10. A system for isolating a source of reference potential from an alternating current line voltage source according to claim 9 wherein a third winding is magnetically coupled to said first winding and electrically isolated therefrom, said third winding being coupled to said source of reference potential for having voltage variations induced thereacross with respect to reference potential; and second rectifying means are coupled to said third winding for rectifying said voltage variations induced thereacross with respect to reference potential and for supplying said rectified variations to said receiver.

* * * * *